United States Patent
Long et al.

(10) Patent No.: US 8,693,353 B2
(45) Date of Patent: Apr. 8, 2014

(54) INTELLIGENT ETHERNET GATEWAY SYSTEM AND METHOD FOR OPTIMIZING SERIAL COMMUNICATION NETWORKS

(75) Inventors: Avery D. Long, Madison, AL (US); Timothy Curray, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 489 days.

(21) Appl. No.: 12/648,187

(22) Filed: Dec. 28, 2009

(65) Prior Publication Data

US 2011/0158244 A1    Jun. 30, 2011

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/42* | (2006.01) |
| *H04L 12/403* | (2006.01) |
| *G06F 15/16* | (2006.01) |
| *G06F 15/173* | (2006.01) |

(52) U.S. Cl.
USPC ........ 370/252; 370/395.5; 370/401; 370/449; 709/208; 709/224

(58) Field of Classification Search
USPC ........ 370/401, 252, 395.5, 449; 709/208, 224
See application file for complete search history.

(56) References Cited

U.S. PATENT DOCUMENTS 5,230,071 A * 7/1993 Newman .................. 710/60
5,933,841 A   8/1999 Schumacher et al.

(Continued)

FOREIGN PATENT DOCUMENTS

| WO | WO2006094908 | 9/2006 |
| WO | WO2006102172 A2 | 9/2006 |
| WO | WO2006128394 | 12/2006 |
| WO | WO2008036303 | 3/2008 |

OTHER PUBLICATIONS

Schneider Electric; "Web-Enabled Ethernet Gateway Simplifies Power Utility Monitoring;" Nov. 2003; (2 pages).

(Continued)

*Primary Examiner* — Alpus H Hsu
*Assistant Examiner* — Yee Lam (57) ABSTRACT

Systems, devices, and computer readable media for optimizing serial communication networks provide an intelligent network gateway through which network data flows. Systems and devices monitor network requests for data packets supplied by slave computing devices, examine the supplied data packets, and copy the supplied data packets to a memory device. The supplied data packets are delivered to a first requesting network device and when an additional network request for the data packets is made by a second requesting network device the data packets are delivered from the memory device to the second requester in response to the additional network request without interrupting the slave computing device to redundantly supply the data packet. Polling by multiple requester devices for redundant data from slave computing devices is avoided. Communication response times are improved, data caching is provided for devices that have no logging memory, and optimum communication settings can be automatically determined.

20 Claims, 5 Drawing Sheets

(56) References Cited

U.S. PATENT DOCUMENTS

| | | | |
|---|---|---|---|
| 5,995,911 A | 11/1999 | Hart | |
| 6,282,709 B1 | 8/2001 | Reha et al. | |
| 6,353,926 B1 | 3/2002 | Parthesarathy et al. | |
| 6,442,574 B1 | 8/2002 | Schumacher et al. | |
| 6,640,268 B1* | 10/2003 | Kumar | 710/46 |
| 6,753,772 B2 | 6/2004 | Winkler | |
| 6,792,337 B2 | 9/2004 | Blackett et al. | |
| 6,845,301 B2 | 1/2005 | Hamamatsu et al. | |
| 7,106,162 B2 | 9/2006 | Saito | |
| 7,237,104 B2 | 6/2007 | Philyaw | |
| 7,272,518 B2 | 9/2007 | Bickel et al. | |
| 7,415,368 B2 | 8/2008 | Gilbert et al. | |
| 7,444,358 B2 | 10/2008 | Paczkowski et al. | |
| 7,574,693 B1 | 8/2009 | Kemink | |
| 7,639,129 B2 | 12/2009 | Bickel et al. | |
| 7,882,092 B2* | 2/2011 | Dasgupta et al. | 707/705 |
| 2002/0090968 A1* | 7/2002 | Lee et al. | 455/527 |
| 2003/0005068 A1* | 1/2003 | Nickel et al. | 709/208 |
| 2003/0028625 A1* | 2/2003 | Sanjeev et al. | 709/220 |
| 2003/0040897 A1* | 2/2003 | Murphy et al. | 703/18 |
| 2003/0126222 A1* | 7/2003 | Peterson et al. | 709/208 |
| 2004/0128146 A1 | 7/2004 | Williams et al. | |
| 2004/0138786 A1* | 7/2004 | Blackett et al. | 700/295 |
| 2004/0255007 A1* | 12/2004 | Salo et al. | 709/219 |
| 2005/0243712 A1* | 11/2005 | MacKinnon et al. | 370/216 |
| 2006/0041630 A1* | 2/2006 | Naismith | 709/208 |
| 2006/0155725 A1* | 7/2006 | Foster et al. | 707/100 |
| 2006/0168396 A1* | 7/2006 | LaMothe et al. | 711/113 |
| 2007/0005277 A1 | 1/2007 | Bickel et al. | |
| 2007/0014313 A1 | 1/2007 | Bickel et al. | |
| 2007/0057782 A1 | 3/2007 | Wimmer | |
| 2007/0067119 A1 | 3/2007 | Loewen et al. | |
| 2007/0263643 A1 | 11/2007 | Wadhawan | |
| 2008/0005379 A1* | 1/2008 | Berenbaum et al. | 710/15 |
| 2008/0079989 A1* | 4/2008 | Agnetta et al. | 358/1.15 |
| 2009/0024794 A1* | 1/2009 | Iyer et al. | 711/118 |
| 2009/0070447 A1* | 3/2009 | Jubinville et al. | 709/223 |
| 2009/0125747 A1* | 5/2009 | Morein et al. | 713/400 |
| 2009/0204665 A1* | 8/2009 | Prall | 709/203 |
| 2009/0287789 A1* | 11/2009 | Dolan et al. | 709/208 |
| 2010/0002758 A1* | 1/2010 | Martwick | 375/227 |
| 2010/0031076 A1* | 2/2010 | Wan et al. | 713/340 |
| 2010/0198535 A1* | 8/2010 | Brown et al. | 702/62 |
| 2011/0103393 A1* | 5/2011 | Meier et al. | 370/401 |
| 2011/0125820 A1* | 5/2011 | Lin | 709/201 |
| 2011/0145499 A1* | 6/2011 | Ananthanarayanan et al. | 711/118 |

OTHER PUBLICATIONS

Schneider Electric; "Instruction Bulletin, Powerlogic Ethernet Gateway;" Jan. 2006; (16 pages).
Schneider Electric; "Transparent Ready Web-enabled Power and Control;" 2003; (8 pages).
Schneider Electric; "PowerLogic ION Reference—ION Architecture & ION Modules;" Dec. 2007; (pp. 485-492).
"IEC 61850 News;" http://iec61850-news.blogspot.com/search/label/merging%20unit; Aug. 2008 (2 pages).
General Electric; "HardFiber System IEC 61850 Process Bus Solution;" http://vvww.gedigitalenergy.com/multilin/catalog/hardfiber.htm; 2007/2008; (available as late as and printed in Nov. 2008); (3 pages).
General Electric; "HardFiber System IEC 61850 Process Bus Solution" Video; http://www.gedigitalenergy.com/multilin/products/hardfiber/HardFiberDemo.html; Aug. 2008; (1 page).
Schniewindt; "OPDL—Systems;" http://www.schniewindt.de/index_e.php?sub=elemente_widerstandstechnik_show_e&id=4; (available as late as and printed in Jan. 2009); (1 page).
Schniewindt; "Hybrid Combined Electronic Instrument Transformer;" http://www.schniewindt.de/downloads/he_ctvt.pdf; Aug. 2003; (4 pages).
Netted Automation Information & Communication Systems (NAICS); "Successful demo of IEC 61850-9-1;" http://www.nettedautomation.com/solutions/uca/products/9-1/index.html; Nov. 2002; (4 pages).
DEC Datasystems: "DEC Data Systems—DataWise Manual" May 6, 2006, XP002470188, pp. 5-6, p. 58-60, p. 129.
Don Landing et al.: "Sensor Data Analysis Framework Research Roadmap—Integrating Stream Processing and Persistent Data Retrieval", Feb. 2006, XP002470189, the whole document.
Harrison M: "EPC Information Service—Data Model and Queries" Internet Citation, Oct. 1, 2003, XP002355668, the whole document.
Gehrke J et al: "Sensor and Actuator networks—Query processing in sensor networks" IEEE Pervasive Computing, IEEE Service Center, Los Alamitos, CA, US, vol. 3, No. 1, Jan. 2004, pp. 46-55, XP011108155, the whole document.
Bonnet P et al: "Querying the Physical World" IEEE Personal Communications, IEEE Communications Society, US, vol. 7, No. 5, Oct. 2000, pp. 10-15, XP000966619, the whole document.
Ledlie J et al: "Provenance-Aware Sensor Data Storage" Dataengineering Workshops, 2005, 21st International Conference on Tokyo, Japan Apr. 5-8, 2005, Piscataway,NJ, USA, IEEE, Apr. 5, 2005, pp. 1189-1189, XP010924091, the whole document.
Kevin Chang et al: "SensorBase.org—A Centralized Repository to Slog Sensor Network Data" Center for Embedded Network Sensing. Papers. Paper 116, May 5, 2006, XP002470190, the whole document.
Written Opinion corresponding to co-pending International Patent Application Serial No. PCT/US2007/011247, European Patent Office, dated May 15, 2008, 12 pages.
International Search Report corresponding to co-pending International Patent Application Serial No. PCT/US2007/011247, European Patent Office, dated May 15, 2008, 8 pages.
"Using the Web for Cost-Effective Energy Information," Jim Lewis and Steve Herzog, Obvious LLC, 2004, 18 pages.
PowerLogic® EGX400 Ethernet Gateway, Web-Enabled Ethernet Gateway Simplifies Power Utility Monitoring, Sep. 2005, Schneider Electric (2 pages).
PowerLogic® Ethernet Gateway User's Guide, Instruction Bulletin, 63230-314-208A3, Jan. 2006, Schneider Electric (16 pages).
ION 7500 / ION 7600 RMICAN-SEAL Checklist, 4 pages. dated Apr. 28, 2006.
ION 7300 / ION 7330 RMICAN-SEAL Checklist, 2 pages. dated Apr. 28, 2006.
ION 6200 RMICAN-SEAL Checklist, 1 page dated Apr. 28, 2006.
ION 8600 RMICAN-SEAL Checklist, 5 pages dated Apr. 28, 2006.
ION 8300 / ION 8400 / ION 8500 RMICAN-SEAL Checklist, 5 pages dated Apr. 28, 2006.
ION 7550 / ION 7650 RMICAN-SEAL Checklist, 4 pages dated Nov. 2006.
Microsoft Office Online: Help and How-to: Find and correct errors in formulas, 2 pages, printed on or before Jul. 29, 2008.
Microsoft Office Excel, Search Excel 2003, Creating data cubes using Excel and text files, 6 pages, printed on or before Jul. 29, 2008.
Microsoft Office Online: Help and How to: Change how PivotTable or PivotChart data is summarized, 1 page, printed on or before Jul. 29, 2008.
Microsoft Office Online: Help and How to: Create a chart from data in a PivotTable report, 1 page, printed on or before Jul. 29, 2008.
Microsoft Office Online: Help and How to: About PivotTable and PivotChart source data, 4 pages, printed on or before Jul. 29, 2008.
Microsoft Office Online: Help and How to: Ways to customize PivotTable reports, 9 pages, printed on or before Jul. 29, 2008.
Microsoft Office Online: Help and How to: Change the layout of a PivotTable report, 2 pages, printed on or before Jul. 29, 2008.
TagScanner 5.0 build 524, 2 pages, printed on or before Jul. 29, 2008.
Windows Update, Ten things you may not know about Wikipedia, from Wikipedia, the free encyclopedia, 2 pages, printed on or before Jul. 29, 2008.
Written Opinion corresponding to co-pending International Patent Application Serial No. PCT/US2008/075833, European Patent Office, dated Jul. 14, 2009, 8 pages.
International Search Report corresponding to co-pending International Patent Application Serial No. PCT/US2008/075833, European Patent Office, dated Jul. 14, 2009, 5 pages.

* cited by examiner

INTELLIGENT ETHERNET GATEWAY SYSTEM AND METHOD FOR OPTIMIZING SERIAL COMMUNICATION NETWORKS

TECHNICAL FIELD

This technology generally relates to energy monitoring systems and in particular to network-based energy monitoring systems and methods using an intelligent network gateway to optimize serial communication networks.

BACKGROUND

Microprocessor-based electrical power distribution equipment such as switchgear, switchboards, panelboards, and motor control centers accumulate considerable amounts of information concerning the electrical distribution systems to which they are connected, as well as the power equipment itself. Today's energy monitoring systems provide end-users with the capability to remotely monitor a variety of equipment via automatic monitoring devices. This allows more accurate data and decreases human resource requirements. Industrial automation, monitoring, energy management, and control systems include many microprocessor or microcontroller-based monitoring devices that communicate with each other, as well as with other computers, via various communications protocols such as the Ethernet for a local area network or the MODBUS® (hereafter "Modbus") communication protocol. The Modbus communication protocol is used with various slave devices that respond to read and write requests from a master controller. Among the features provided by this communication protocol is a means for the user to access data from either an RS-232 or RS-485 serial connection from the slave device to the master controller.

Recently, communications to a data collection system from monitoring devices has been implemented over a network using an Ethernet protocol, wrapped in a TCP/IP format, which provides the ability to access these devices from potentially anywhere via a network. Typically, monitoring devices such as meters are connected to points in an electrical distribution system and obtain data from that point in the electrical distribution system. The meter is also connected to the data collection system via the network. Therefore, configuration is required in multiple places in the energy monitoring system. The meter is configured with detailed information required for the connection to the meter from the data collection system. The configuration information may be the mode of the meters, communications parameters, identification information, or other information required for the correct interpretation of the data collected by the meter. Conversely, configuration of the data collection system is required in order to access the meter and use the data sensed by the meter.

Currently energy consumers who wish to monitor their energy use through an energy monitoring system employ many different personnel who are responsible for meter configuration, installation, and monitoring. In addition, personnel must be employed to configure the data collection system for new meters. The time and resources necessary to configure a meter and the data collection system also result in lost data if the time period between installation and configuration exceeds the capacity of the meter to record data.

Additionally, a Modbus network can have multiple slave devices on a common network, such as a common RS485 network. The slave devices can communicate at up to 38.4 kbps. Modbus master devices can poll a slave device at a very high rate to the point a Modbus slave's idle time can diminish to zero for certain periods of time. This can potentially lead to system resets or shut down tasks that users can configure to free up available bandwidth. With Ethernet gateways communicating Modbus TCP/IP with multiple connections, it is possible for a large number of outside devices to want to poll the slave devices. Many times, these outside devices are asking for the "same" data. These multiple requests for the same data tie up network resources and negatively affect network performance.

BRIEF SUMMARY

In an example, a method for optimizing delivery of data in a communication network includes receiving, at a gateway, a network request for a data packet supplied by a slave computing device and examining, by the gateway, attributes of the supplied data packet. The data packet includes electrical data indicative of a characteristic sensed by the slave computing device. The method also includes copying, under control of the gateway, the supplied data packet to a memory device and delivering the supplied data packet to a first requesting network device. The gateway then determines when an additional network request for the same electrical data is made by a second requesting network device and delivers the data packet from the memory device to the second requesting network device in response to the additional network request without interrupting the slave computing device to supply the same electrical data.

The communication network can include a serial communication network, a Modbus protocol network; a TCP/IP protocol network, a User Datagram Protocol (UDP) network, a Hypertext Transfer Protocol (HTTP) network, an RS485 network, and an Ethernet network. Further, the network request can be a Modbus protocol request.

The slave computing device can be a power monitoring device operable to sense a characteristic of electricity and to communicate data indicative of the sensed characteristic over the communication network. Further, the memory device can be a cache memory, for example. Additionally, the first requesting network device receiving the supplied data packet can be a first computing device and the second requesting network device making the additional network request for the data packet can be a separate second computing device. Alternatively, the first requesting network device receiving the supplied data packet and the second requesting network device making the additional network request for the data packet can be the same computing device.

The network request can be made by an Ethernet device. Examining the attributes of the supplied data packet can include statistically tracking which data packets are requested, and the gateway can copy the supplied data packets that are most requested based upon the tracked statistics. Also, the gateway can copy the supplied data packets that are most recently requested based upon the tracked statistics.

The system can further include adjusting a polling rate for the first requesting network device, the second requesting network device, and the slave computing device to reduce a frequency of polling requests to the slave computing device. Examining the attributes of the supplied data packet can include statistically tracking polling rates of the requesters as well as benchmarking performance of the slave computing device in supplying the supplied data packet. Based upon the benchmarked performance, the system can determine optimal serial network settings and provide the optimal serial network settings to a system administrator.

The system can analyze throughput characteristics of the communication network based on the benchmarked performance and expand the communication network based upon the throughput analysis.

The system can determine a change in response time of the slave computing device in supplying the data packet. Additionally, the gateway can indicate that network settings for the slave device are incorrect based upon the change in response time and indicate a hardware failure of the slave device. Copying the supplied data packet to a memory device can include data caching for slave devices that have no logging memory.

In another example, a method for reducing polling requests communicated across a communication network in a power monitoring system to slave computing devices includes receiving, at a gateway, a network request for a data packet to be supplied by a slave computing device on the communication network. The data packet can include electrical data indicative of a characteristic sensed by the slave computing device in the power monitoring system. The gateway stores a copy of the data packet in a memory and determines whether multiple network devices on the communication network are requesting the same electrical data from the slave computing device. Responsive to determining that multiple requesting network devices are requesting the same electrical data, the gateway communicates to one or more of the requesting network devices the copy of the data packet from the memory. Responsive to communicating the copy of the data packet, the gateway adjusts a polling rate for the requesting network device and/or the slave computing device to reduce a frequency of polling requests to the slave computing device.

These and other advantages, aspects, and features will become more apparent from the following detailed description when viewed in conjunction with the accompanying drawings. Non-limiting and non-exhaustive embodiments are described with reference to the following drawings. Accordingly, the drawings and descriptions below are to be regarded as illustrative in nature, and not as restrictive.

DETAILED DESCRIPTION

In the below examples, reference is made to the transmission control protocol, but it should be understood that the systems and methods discussed can also be implemented in any network transmission protocols and transport layer protocols that network traffic management algorithms, such as the transmission control protocol (TCP), Stream Control Transmission Protocol (SCTP), and Reliable Datagram Protocol (RDP), for example.

Figure 1:
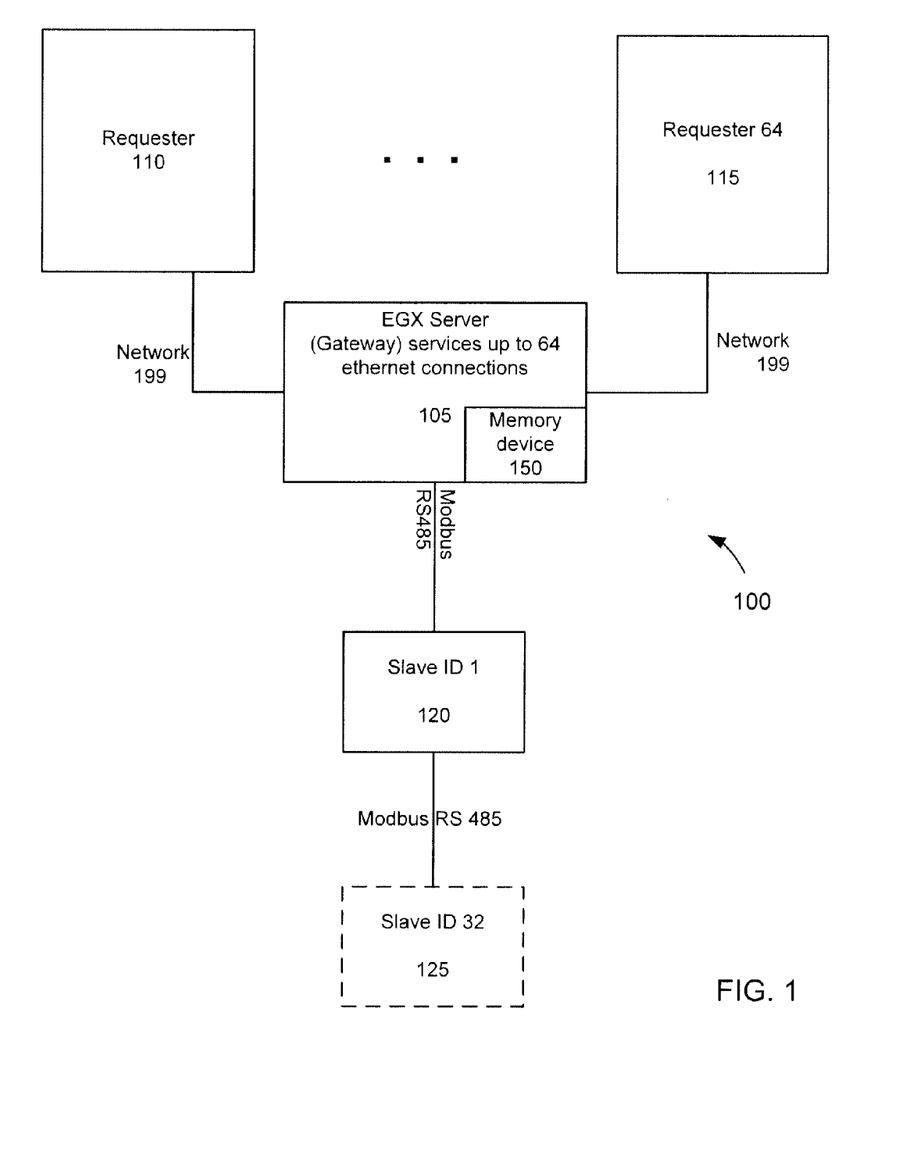
FIG. 1 is a functional block diagram of an energy monitoring system that includes monitoring devices connected through a network.

According to an example utility system 100 illustrated in FIG. 1, an intelligent Ethernet gateway 105 tracks and manages data that is requested by (master) Ethernet devices 110, 115. For clarity and brevity, in FIG. 1 two master requesters 110, 115 are shown, but it should be understood that any number of requesters can use the exemplary utility system 100. Requesters 110, 115 can be Modbus masters, additional servers, gateways, and the like. Likewise, while two slave devices 120, 125 are shown in FIG. 1, any number of slave devices can also use the exemplary utility system 100 as well. Slave devices 120, 125 can by power monitoring devices, for example, which sense current, voltage, or power, for example, from conductors carrying electrical current in the power monitoring system, and store data indicative of the sensed characteristic (such as current, voltage, or power).

The intelligent Ethernet gateway 105 receives all packet requests on the network 199 in an exemplary implementation. The intelligent Ethernet gateway 105 can keep copies of the latest packets by storing them on a memory device 150 and send them back out to the (master) Ethernet devices 110, 115 without interrupting the slave devices 120, 125 for the same packet request. The intelligent Ethernet gateway 105 can store statistical data regarding the network performance of slave devices 120, 125 in the memory device 150 and can predict optimal polling rates to avoid bursts of packet requests. These statistical data regarding network performance can include application speed test results, capacity speed test results, route speed test results, forced idle test results, time variation test results, and other network performance results of the devices. Although the memory device 150 is shown in FIG. 1 as being integral with the Ethernet gateway 105, the memory device can alternately be external to and remotely accessible by the Ethernet gateway 105.

The intelligent Ethernet gateway 105 can benchmark the slave devices 120, 125 by making packet requests on their own and polling the slave devices 120, 125 to determine their sensitivity to serial communications. This can be performed by the intelligent Ethernet gateway 105 increasing the baud rates of the slave devices 120, 125 to the maximum supported rate and polling the idle time of the slave devices 120, 125. This benchmarking can be performed in the field to determine unique device performance results for the particular slave device 120, 125 being polled. The intelligent Ethernet gateway 105 can make recommendations with regard to optimal serial network settings based on all attached slave devices 120, 125. Additionally, the intelligent Ethernet gateway 105 can make recommendations with regard to expanding the communication network based upon the device performance results and throughput analysis when it appears that the existing network and network devices are operating at the limits of their effectiveness. These recommendations can be sent to a system administrator (not shown) by email or other electronic delivery schemes.

The intelligent Ethernet gateway 105 responsible for polling the slave devices 120, 125 can control network traffic going to the Modbus slave device 120, 125 based on an idle time of communication and available bandwidth on the Modbus slave being polled. The intelligent Ethernet gateway 105 can serve as the master of the serial communication channels and can therefore determine the entropy or available bandwidth on a serial channel. The intelligent Ethernet gateway 105 can track baud rate, protocol, and, by evaluating the slave devices 120, 125, can estimate how much free time there is on a serial channel. Register and estimation techniques can be standardized for slave devices 120, 125 to calculate their idle time that the intelligent Ethernet gateway 105 can use with the channel bandwidth to slow down communications to Ethernet masters 110, 115, helping them establish polling times or send an alarm that a device is being overloaded with communications and to start backing off on polling. Additionally, the intelligent gateway 105 can benchmark performance of the slave devices 120, 125 and note when a change in response time occurs. The change in response time can indicate that settings may not be optimal for the slave device or that the slave device has suffered a failure, or that the existing network is operating at maximum capacity. Additionally, the communication network 199 can be used to bring the idle time of some Modbus slave devices to very low levels where a system reset can occur.

The intelligent Ethernet gateway 105 can use statistical analysis for most frequently asked-for packets or registers. The memory device 150 on intelligent Ethernet gateway 105 can act as a cache, and the intelligent Ethernet gateway 105 can keep a table for the slave devices connected, such as slaves 120, 125. System software such as SMS or ION ENTERPRISE available from Schneider Electric can frequently poll the same registers for alarms or table data. The intelligent Ethernet gateway 105 can use this information about the polled registers to establish a Frequently Asked Registers (FAR) table similar to a Most Recently Used (MRU) list where the intelligent Ethernet gateway 105 polls the slave devices 120, 125 periodically on its own and stores the contents in tables in the memory device 150. An example FAR table 275 is shown in FIG. 2.

Returning to FIG. 1, when a Modbus request is received by the intelligent Ethernet gateway 105, the gateway 105 determines if the content was already located in its FAR table or memory device 150. Statistically, the resident data can be used to improve system response time and to avoid redundant polls of the serial slave devices 120, 125. Using local copies of frequently asked for registers in memory allows the intelligent Ethernet gateway 105 to immediately respond for registers that it is caching.

Because the intelligent Ethernet gateway 105 can have multiple masters 110, 115 requesting data, there is a good probability that each requester 110, 115 is asking for the same data sets. FAR tables can eliminate each request interrupting the slave device 120, 125 for data as the data is requested. FAR tables can provide a method where multiple (master) requesters 110, 115 asking for the same data are seen only by the slave device 120, 125 as one request.

Figure 2:
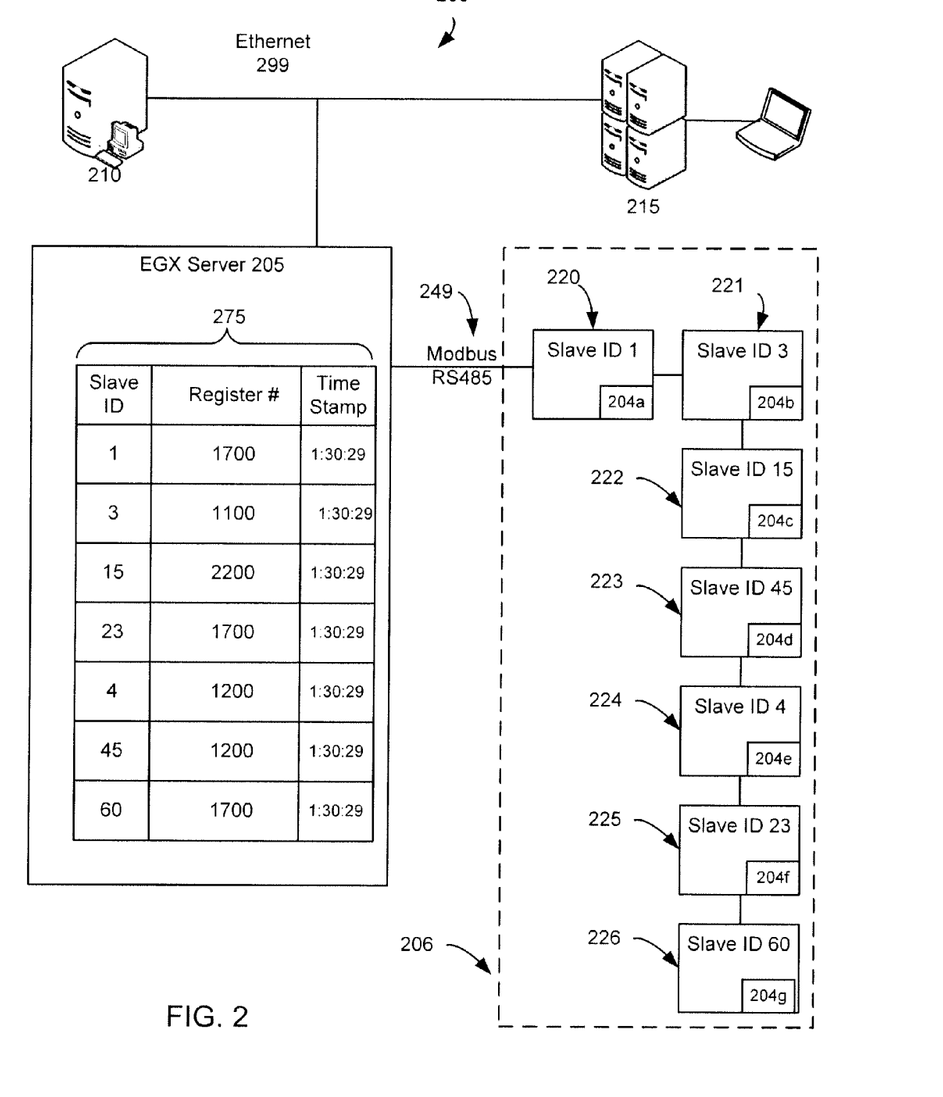
FIG. 2 is a block diagram of a power monitoring system in an energy monitoring environment.

FIG. 1 described above shows a functional block diagram of an energy monitoring system that includes monitoring devices connected through a network, and FIG. 2 provides additional details to FIG. 1, including a power monitoring system in an energy monitoring environment that is in accordance with FIG. 1. In FIG. 2, a utility system 200 is shown including a utility monitoring system 206, a network 299, and one or more requesters 210, 215. The utility monitoring system 206 includes multiple slave devices 220, 221, 222, 223, 224, 225, 226 configured as intelligent electronic devices (LEDs). IED slave devices 220, 221, 222, 223, 224, 225, 226 are each coupled to the one or more requesters 210, 215 via an intelligent Ethernet gateway 205 and the network 299. Each of the IED slave devices 220, 221, 222, 223, 224, 225, 226 includes a respective rewriteable memory 204a-g (such as EEPROM or flash memory) for storing firmware that is executed by a respective microcontroller (not shown) in the IEDs. The reference number 204 refers to any of the memory devices 204a-g. For example, the IED slave devices 220, 221, 222, 223, 224, 225, 226 can have the ability to sample, collect, or measure one or more operational characteristics of a utility system. The IED slave devices 220, 221, 222, 223, 224, 225, 226 can be capable of storing data in onboard memory and are capable of communicating with the intelligent Ethernet gateway 205 via the Modbus network 249 to transmit measured parameters to the intelligent Ethernet gateway 205 and to the requesters 210, 215 for display, storage, reporting, alarming, and other functions. The IED slave devices must also be minimally capable of storing basic information in the form of setup parameters locally. Each monitoring device, represented by the IED slave devices 220, 221, 222, 223, 224, 225, 226, measures characteristics of electricity, such as current, voltage, energy, or power, and quantifies these characteristics into corresponding data that can be further analyzed by software and other devices.

The utility being monitored by the utility monitoring system 206 can be any of the five utilities designated by the acronym WAGES, or water, air, gas, electricity, or steam. Examples of the operational characteristics that can be monitored by the utility monitoring system 206 include, in the electrical context, current, voltage, power, or energy, to name a few. In other contexts, the operational characteristics can include volumetric flow rates, mass flow rates, volumetric flux, mass flux, and the like, to name a few. In the electrical utility context, the IED can be based on a POWERLOGIC® Series CM3xxx/CM4xxx Circuit Monitor or a POWERLOGIC® PM7xx/8xx or ION7550/7650 Power and Energy Meter available from Schneider Electric or any other suitable monitoring device (e.g., circuit monitor), a circuit breaker, a relay, a metering device, or a power meter. Such devices conventionally include a sensor that measures an electrical characteristic and produce data representing the measured electrical characteristic.

A few other examples of IEDs include a MICROLOGIC® Trip Unit, a programmable logic controller (PLC), a Remote Terminal Unit (RTU), a fault recorder, a gateway, such as an EGX Ethernet-to-Serial gateway available from Schneider Electric, or a protection relay. Any combination of these devices can exist in the utility monitoring system 206. The IED includes hardware that enables connectivity to the network 299 via a network connection, such as an Ethernet connection.

The gateway device 205 can be an EGX Ethernet gateway available from Schneider Electric that does not monitor or measure a characteristic of the utility system. Such a device can be referred to herein as an "Ethernet-enabled device" or an EED.

The Ethernet gateway device 205 periodically communicates with the monitoring devices such as the IED slave devices 220, 221, 222, 223, 224, 225, 226 in the energy monitoring system 200 to gather data collected locally by the IED slave devices 220, 221, 222, 223, 224, 225, 226. In this example, the intelligent Ethernet gateway 205 is responsible for initiating communication with monitoring devices such as the IED slave devices 220, 221, 222, 223, 224, 225, 226. Of course, there may be networked data collection systems where the monitoring devices are responsible for pushing data periodically to a data collection system, such as intelligent Ethernet gateway 205.

In this example, the network 299 is a local area network (LAN). Of course other network topologies such as a token ring or serial loop can be used. The network 299 can include the Internet, wide area networks (WANs), direct connections, such as through a universal serial bus (USB) port, other forms of computer-readable media, or any combination thereof. On an interconnected set of LANs, including those based on differing architectures and protocols, a router can act as a link between LANs, to enable messages to be sent from one to another. Also, communication links within LANs typically include twisted wire pair or coaxial cable, while communication links between networks can utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

The network 299 can further employ a variety of wireless access technologies including, but not limited to, second (2G), third (3G) generation radio access for cellular systems, Wireless-LAN, Wireless Router (WR) mesh, and the like. Access technologies such as 2G, 3G, and future access networks may enable wide area coverage for mobile devices, such as additional client devices (not shown) with various degrees of mobility. For example, the network 299 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices can be remotely connected to either LANs or WANs via a modem and temporary telephone link. In essence, the network 299 includes any communication method by which information can travel between devices such as IED slave devices 220, 221, 222, 223, 224, 225, 226, intelligent Ethernet gateway 205, requesters 210, 215, and the like.

Additionally, the network 299 can include communication media that typically embodies computer-readable instructions, data structures, program modules, or other data in a modulated data signal such as a carrier wave, data signal, or other transport mechanism and includes any information delivery media. The terms "modulated data signal" and "carrier-wave signal" include a signal that has one or more of its characteristics set or changed in such a manner as to encode information, instructions, data, and the like, in the signal. By way of example, communication media can include wired media such as, but not limited to, twisted pair, coaxial cable, fiber optics, wave guides, and other wired media and wireless media such as, but not limited to, acoustic, RF, infrared, and other wireless media.

In this example, the IED slave devices 220, 221, 222, 223, 224, 225, 226 communicate over a Modbus network 249 in the utility monitoring system 206 and to intelligent Ethernet gateway 205. If necessary, intelligent Ethernet gateway 205 can convert Modbus communications protocol data packets associated IED slave devices 220, 221, 222, 223, 224, 225, 226 and the Ethernet TCP/IP protocol of the example network 299 for consumption by requesters 210, 215.

Additional network devices can be coupled to the network 299 to provide additional network services. In this example, the network 299 is coupled to a first requester 210 and a second requester 215. The intelligent Ethernet gateway 205 can be configured for dynamic host configuration protocol (DHCP) services and can be responsible for providing key network parameters to devices such as the IED slave devices 220, 221, 222, 223, 224, 225, 226 that connect to the network 299 and request such parameter values from the requesters 210, 215. Such parameters can include the IP address for the devices, the IP address of the domain name services server or servers on the network and the domain name of devices that are coupled to the network 299. Likewise, the intelligent Ethernet gateway 205 can be configured to provide domain name services (DNS) and can be responsible for resolving host names and IP address lookup requests. Of course it is to be understood that other network devices (not shown) can also serve the distinct functions (DHCP and DNS) described.

Figure 3:
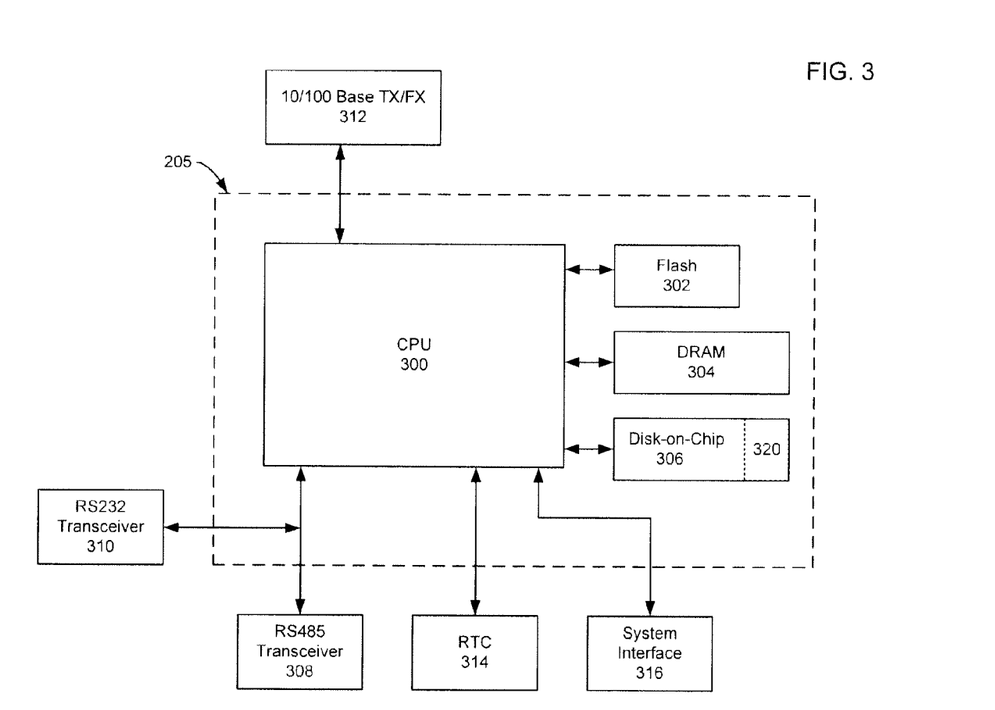
FIG. 3 is a block diagram of an exemplary intelligent Ethernet gateway.

FIG. 3 is a block diagram of an intelligent Ethernet gateway such as the intelligent Ethernet gateway 205 in FIG. 2. The intelligent Ethernet gateway 205 includes a CPU 300, a flash memory 302, a DRAM 304, a disk-on-chip memory 306, an RS-485 transceiver 308, an RS-232 transceiver 310, an Ethernet interface 312, and a real time clock 314. The intelligent Ethernet gateway 205 can also include a current transformer or other energy system interface device 316, used to couple the intelligent Ethernet gateway 205 to the utility monitoring system 206 and to measure the characteristics of the point being monitored. The Ethernet interface 312 has one or more on-board Ethernet ports, e.g., one for a 10/100 Base TX Twisted Pair connection and another for a 100 Base Fx connection. The Ethernet interface 312 is coupled to the network 299 in FIG. 2. In this example, the RS-485 transceiver 308 has an RS-485 serial port for coupling to the slave devices such as the IED slave devices 220, 221, 222, 223, 224, 225, 226 shown in FIG. 2. The RS-485 port of the RS-485 transceiver 308 typically supports multiple devices without a repeater. Similarly, slave devices such as the IED slave devices 220, 221, 222, 223, 224, 225, 226 shown in FIG. 2 can alternately be coupled to a serial line coupled to the RS-232 transceiver 310. The real time clock 314 provides time data to stamp entries in a local data log 320, stored in the disk-on-chip memory 306 as will be explained below.

The processor 300 in FIG. 3 collects, stores, and distributes data measured by the IED slave devices 220, 221, 222, 223, 224, 225, 226. The processor 300 in this example of intelligent Ethernet gateway 205 also collects, stores, and distributes data relating to Modbus communications between the requesters 210, 215 and the slave devices of the utility data monitoring system 206 such as the IED slave devices 220, 221, 222, 223, 224, 225, 226 received through the transceiver 310 or transceiver 308. In these examples, the log 320 provides local storage of data collected by the IED slave devices in the disk-on-chip memory 306 until the IEDs are polled to send data to the intelligent Ethernet gateway 205 in FIG. 2. Alternatively, the log 320 may be stored in the flash memory 302. The log 320 can be subject to a first in first out (FIFO) procedure to handle an overflow of data. If the log 320 is full, the oldest entry will be discarded for a new log data entry. Alternatively, the log 320 can be subject to a fill-and-hold procedure whereby entries are recorded in the log 320 until the log 320 is full. Once the log 320 is full, no more entries will be recorded unless the user resets the log via the intelligent Ethernet gateway 205 in this example. Of course it is to be understood that the log can be reset locally via controls from the IED itself. This is useful if the user wishes to download the data to another storage device with more capacity (such as a computer acting as the intelligent Ethernet gateway 205, for example) on a scheduled basis. The log 320 can then be cleared. This may give the user the option of storing all of the data recorded in the log 320 if downloading is done on a regular basis.

Figure 4:
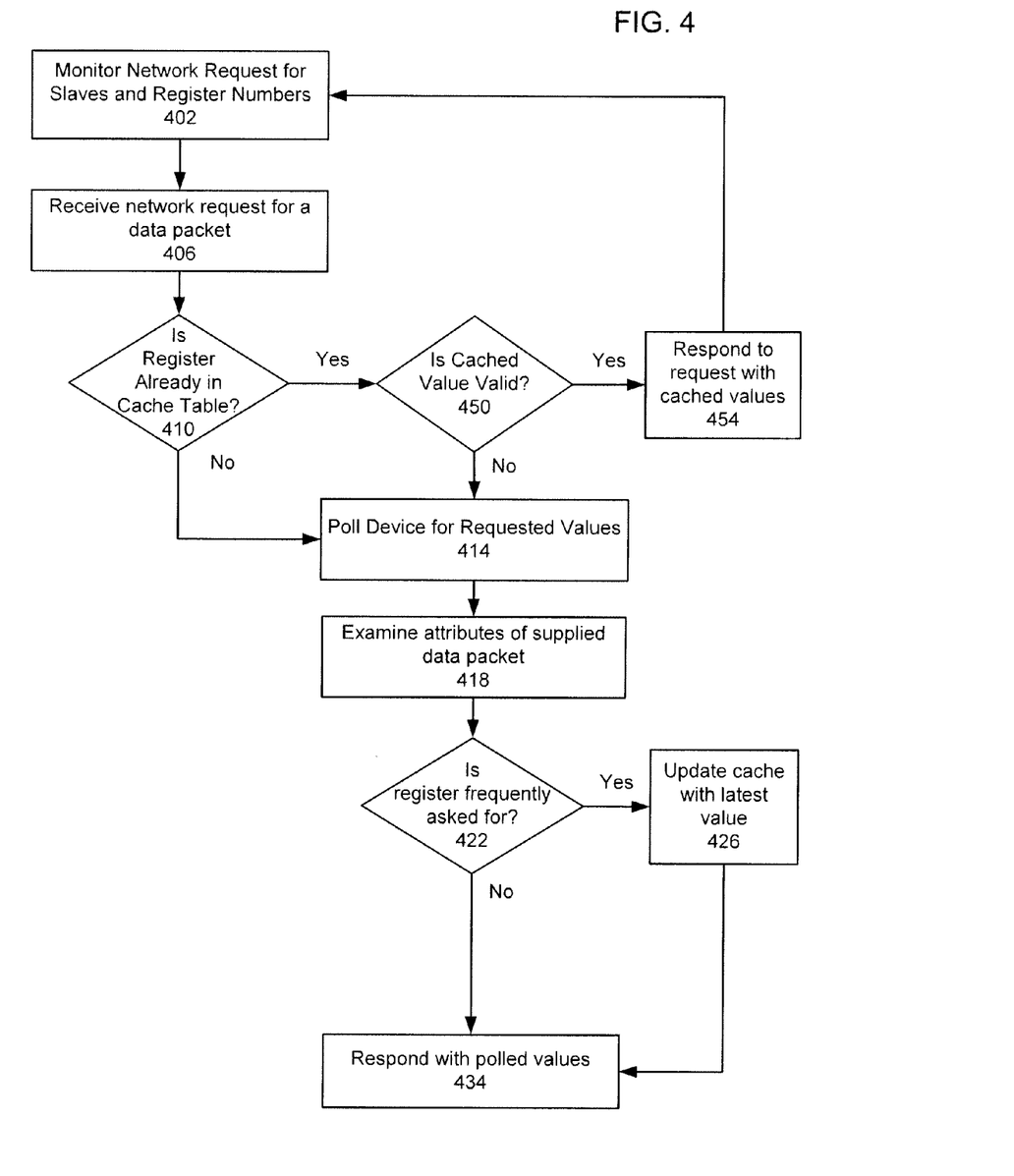
FIG. 4 is a flow diagram of an example method for optimizing delivery of data in a power monitoring communication network using an example intelligent Ethernet gateway to reduce polling requests.

FIG. 4 is a flow diagram of an example method for optimizing delivery of data in a power monitoring communication network where an intelligent Ethernet gateway 205 can be used to reduce polling requests communicated across communication network 249 between the gateway 205 and the IEDs 220, 221, 222, 223, 224, 225, 226. In block 402, the intelligent Ethernet gateway 205 monitors network 299 for a network request. In block 406, the intelligent Ethernet gateway 205 receives a network request for a data packet supplied by a slave computing device. The network request can be from any device on network 299, including Ethernet devices such as requesters 210, 215, for example. Additionally, the network request can be a Modbus protocol request, or other protocol request, for example. The requester 210 can request monitoring data from an IED slave device, such as the IED slave device 221 that has Slave ID 3. Of course other slave devices, such as those operable to sense a characteristic of electricity and to communicate data indicative of the sensed characteristic over the communication network can also be employed. As outlined above, the communication network 299 can include any communication network, including a serial communication network, a Modbus protocol network; a TCP/IP protocol network, a User Datagram Protocol (UDP) network, a Hypertext Transfer Protocol (HTTP) network, an RS485 network, and an Ethernet network, for example.

In block 410, intelligent Ethernet gateway 205 reviews the network request and determines if the requested data packet information, such as a register or register values, for example, are in a cache table, such as cache table 275 in FIG. 2. The specific configuration information provided in the requested data packet information (registration request) can include the wiring mode (e.g., the specific method used to connect the IED to a three-phase electrical system) or other information that the intelligent Ethernet gateway 205 uses to correctly interpret data values sent by the IED slave devices. If the register is not in the cache table 275, intelligent Ethernet gateway 205 polls the IED slave computing device 221 in block 414. The intelligent Ethernet gateway 205 can make polling requests via the network 249 to the IEDs 220, 221, 222, 223, 224, 225, 226.

Continuing with the scenario where a register is not already in the cache table 275, in block 418, the IEDs 220, 221, 222, 223, 224, 225, 226 receive the polling request and send a response with the requested data for storage and analysis by the intelligent Ethernet gateway 205. The intelligent Ethernet gateway 205 examines attributes of the supplied data packet. The data packet includes electrical data indicative of an electrical characteristic sensed by the IED slave computing device 221, for example. In examining the attributes of the supplied data packet, the intelligent Ethernet gateway 205 can statistically track which data packets are requested. For example, the intelligent Ethernet gateway 205 can track the frequency with which the supplied data packets are requested and copy the most frequently requested data packets. Similarly, the intelligent Ethernet gateway 205 can track the most recently requested data packets and copy the most recently requested data packets based upon the tracked statistics. Additionally, when examining the supplied data packets, intelligent Ethernet gateway 205 can statistically track polling rates of the requesters.

In any event, in block 422, based on the examination of the attributes of the supplied data packet, intelligent Ethernet gateway 205 determines if the requested register is frequently requested by requesters, such as the requesters 210, 215. If the intelligent Ethernet gateway 205 determines that the requested register is often requested, the cache 275 can be updated with the latest value of the supplied data packet in block 426.

If the intelligent Ethernet gateway 205 determines that the requested register is not frequently requested, the intelligent Ethernet gateway 205 delivers the supplied data packet to a first requesting network device (434). As outlined above, the first requesting device can be the requester 210, for example. The process returns to block 402 where intelligent Ethernet gateway 205 again monitors the network 299 for requests.

When intelligent Ethernet gateway 205 receives an additional network request for a data packet from a second requesting device in block 406 and determines, in block 410, that the additional network request is for the same electrical data in a cached register, the intelligent Ethernet gateway 205 evaluates the cached data packet in block 450 to determine whether a value in the data packet is valid. If the value in the data packet is not valid, the process continues to block 414 as before, and the intelligent Ethernet gateway 205 polls IED slave computing device 221. If, however, the cached value of the register is valid in block 450, intelligent Ethernet gateway 205, in block 454, delivers the data packet from the memory device to the second requesting network device in response to the additional network request without interrupting the slave computing device to supply the same electrical data.

In an example, the first requesting network device receiving the supplied data packet is a first computing device and the second requesting network device making the additional network request for the data packet is a second computing device. This can be the case when requester 210 and requester 215 both want to access the same data packet from the same IED slave computing device, such as IED slave computing device 221, for example. In another example, the first requesting network device receiving the supplied data packet and the second requesting network device making the additional network request for the data packet are the same computing device. This can be the case when a requester requests data from an IED slave computing device at periodic intervals, for example.

In this manner, the system 200 optimizes delivery of data in a power monitoring communication network 249 where the intelligent Ethernet gateway 205 reduces polling requests communicated across the communication network 249 between the gateway 205 and the IEDs 220, 221, 222, 223, 224, 225, 226.

Likewise, for example, when the Ethernet gateway 205 examines the supplied data packet and statistically tracks the polling rate of the requesters, based on the tracked polling rates, the gateway 205 can adjust a polling rate for at least one of the first requesting network device, the second requesting network device, and the slave computing device to reduce a frequency of polling requests to the slave computing device. In this respect, the intelligent Ethernet gateway 205 can benchmark performance of the slave computing devices in supplying the supplied data packet. With the benchmark performance measurements, the intelligent Ethernet gateway 205 can determine optimal serial network settings based on the benchmarked performance and provide the optimal serial network settings to a system administrator via an automatically generated email or other notification process. Additionally, throughput characteristics of the communication network can be analyzed based on the benchmarked performance, and the communications network can be expanded based upon the throughput analysis. For example, in benchmarking performance, a change in response time of the slave computing device in supplying the data packet can be determined, which could indicate that network settings for the slave device are incorrect or that a hardware failure of the slave device occurred.

In the example in FIG. 2, there is a single utility monitoring system 206 coupled to the network 299. Of course a network can include multiple utility monitoring systems some or all of which are similar to the utility monitoring system 206 in FIG. 2. With multiple utility monitoring systems coupled to a network, a process is applied to determine which monitoring device should be contacted for polling information or which utility monitoring system a monitoring device should contact for sending information. An example of such a process is to allow each of the multiple utility monitoring systems to have the capability to redirect the monitoring device to the address of another utility monitoring system. In this example, a single utility monitoring system includes a master device that includes the information required to determine which monitoring devices should communicate with which utility monitoring system on the network. The above process in FIG. 4 is thus modified in that the response 434 would direct the meter to re-request a connection from a different utility monitoring system. This second, re-request would result in a second response 434 (from the second, correct, utility monitoring system) and operation would continue as described above.

An "idle time" register can be implemented in slave devices, such as in the IED slave devices 220, 221, 222, 223, 224, 225, 226. The idle time register presents an indication of the "idle" processing power, such as communications or general, available on the slave device. The intelligent Ethernet gateway 205 can read this register with other data registers and use it to manage polling rates for slave devices.

Additionally, the intelligent Ethernet gateway 205 can perform "predictive" polling, in which the intelligent Ethernet gateway 205 tracks the timing of requests from master requesters as well as the popularity of certain requests based on how frequently they are made relative to other requests. The intelligent Ethernet gateway 205 can use this information to anticipate polling TED slave devices 220, 221, 222, 223, 224, 225, 226 for data in advance of receiving a request from one or more master requesters 210, 215, storing the received slave data in cache and serving it up upon request. This technique capitalizes on the fact that master requesters 210, 215 often consistently poll for the same data on a scheduled basis. This manner of operation assists in scheduling packet requests and deliveries to minimize bursts. In an example, a "closed loop" technique is used where the intelligent Ethernet gateway 205 determines predictive polling and register caching for slave devices, gathers data, and then provides notification to master requesters 210, 215 that data they are likely to request is available for them to request.

The intelligent Ethernet gateway 205 can benchmark TED slave devices 220, 221, 222, 223, 224, 225, 226 on their own to determine performance characteristics. Optimal polling rates can be automatically set for slave devices by first determining the slave type (using auto-discovery techniques, or reading specific register(s)). The intelligent Ethernet gateway 205 can further determine optimal communication parameter settings for each slave device by conducting polling tests using a variety of requests, at different baud rates, and tracking slave response time. Intelligent Ethernet gateway 205 can increase the slave baud rates to the maximum supported and then poll the slaves' idle time monitors and reset counters and then self-adjust the polling rates. In an example, the intelligent Ethernet gateway 205 can determine the lowest common baud rate supported by all slaves on a serial link and then use that baud rate for all slaves. In another example, the intelligent Ethernet gateway 205 can dynamically switch baud rate depending on the slave with which it initiates communications.

Figure 5:
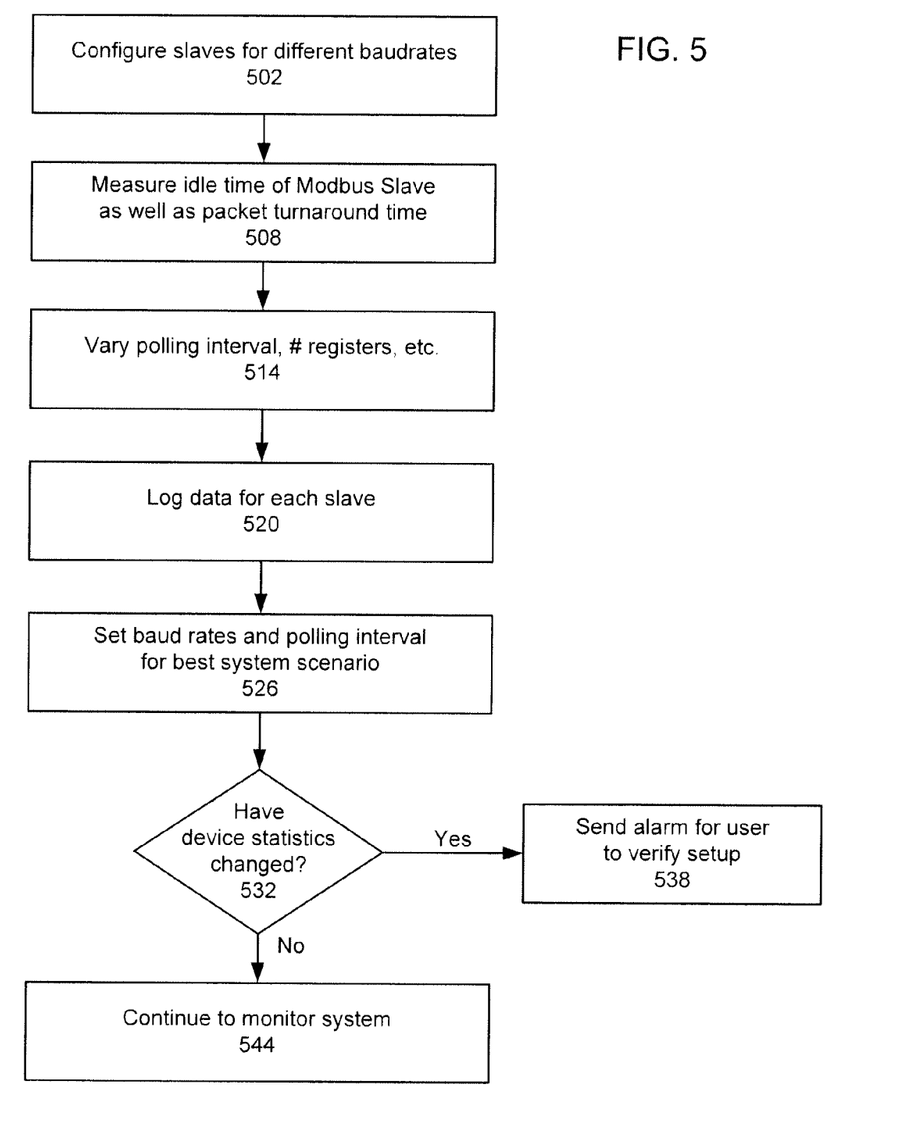
FIG. 5 is a flow diagram outlining an example process for benchmarking and setting polling rates for IED slave devices.

A flow diagram outlining a process for benchmarking and setting polling rates for TED slave devices 221, 222, 223, 224, 225, 226 is shown in FIG. 5. In block 502, intelligent Ethernet gateway 205 configures TED slave devices 220, 221, 222, 223, 224, 225, 226 for different baud rates.

In block 508, intelligent Ethernet gateway 205 measures the idle time of the TED slave devices 221, 222, 223, 224, 225, 226 and the packet turnaround time. In block 514, intelligent Ethernet gateway 205 varies the polling interval, the number of registers, and other communication characteristics, and in block 520, intelligent Ethernet gateway 205 logs the results for each of the benchmark variables.

Based upon the benchmark results, in block 526, the intelligent Ethernet gateway 205 sets baud rates and polling intervals for optimum system performance. For example, the intelligent Ethernet gateway 205 can estimate the amount of free time on each serial channel by the polling results of the slave devices' idle time monitor and reset counter. Baud rates and polling rates can be set just below a reset threshold. When slave devices become overloaded with communications polls and data packet transmissions, the intelligent Ethernet gateway 205 can back off polling rates.

In block 532, the intelligent Ethernet gateway 205 determines if the benchmark statistics have changed since the benchmark tests were last performed. Significant changes in performance can be indicative of improper device settings and/or a possible device failure. If the benchmark statistics have changed, an alarm can be sent to a system administrator or other user in block 538 to investigate further the cause of the performance reduction. If, in block 532, the performance statistics have not change, the intelligent Ethernet gateway 205 continues to monitor the network 299 and system 200.

Any of the algorithms described herein include machine readable instructions for execution by: (a) a processor, (b) a controller, and/or (c) any other suitable processing device. It will be readily understood that a monitoring device includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In addition, two or more computing systems or devices can be substituted for any one of the systems in the system 200. Accordingly, principles and advantages of distributed processing, such as redundancy, replication, and the like, also can be implemented, as desired, to increase the robustness and performance of the devices and systems of the system 200. The system 200 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of an example process to optimize serial communication networks is shown in FIGS. 1-5. The flow diagrams in FIGS. 4-5 are representative of example machine-readable instructions for implementing the intelligent Ethernet device 205 and/or the process to optimize serial communication networks. The algorithms described herein are example machine-readable instructions for implementing a method in accordance with the examples described in the present disclosure. In an example, the machine-readable instructions include an algorithm for execution by: (a) a processor, (b) a controller, and/or (c) one or more other suitable processing device(s). The algorithm can be instantiated in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, any algorithm described herein can be implemented by an application specific integrated circuit (ASIC), a programmable logic device (PLD), a field programmable logic device (FPLD), a field programmable gate array (FPGA), discrete logic, etc.). For example, any or all of the components of the serial communication network optimization process can be implemented by software, hardware, and/or firmware. Also, some or all of the machine readable instructions described herein can be implemented manually. Further, although examples of the intelligent Ethernet gateway system and method for optimizing serial communication networks are described and illustrated herein, persons of ordinary skill in the art will readily appreciate that many other methods of implementing the example machine-readable instructions can alternatively be used. For example, the order of execution can be changed, and/or some of the steps described can be changed, eliminated, or combined.

Having thus described the basic concept of the intelligent Ethernet gateway system and method for optimizing serial communication networks, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as can be specified in the claims. Accordingly, the invention is limited only by the following claims and equivalents thereto.

What is claimed is:

1. A method for optimizing delivery of data in a communication network comprising:
    receiving, at a gateway, a network request for a data packet supplied by a slave computing device;
    examining, by the gateway, attributes of the supplied data packet, wherein examining the attributes of the supplied data packet includes statistically tracking polling rates of network requests to the slave computing device, the data packet including electrical data indicative of a characteristic sensed by the slave computing device;
    copying, under control of the gateway, the supplied data packet to a memory device;
    delivering the supplied data packet to a first requesting network device;
    determining, by the gateway, when an additional network request for the same electrical data is made by a second requesting network device;
    delivering the data packet from the memory device to the second requesting network device in response to the additional network request without interrupting the slave computing device to supply the same electrical data;
    benchmarking network performance of the slave computing device based on the delivery of the supplied data packet to the first requesting network device; and
    controlling network traffic to the slave computing device based on the benchmarked network performance.

2. The method of claim 1, wherein the communication network includes a serial communication network, a Modbus protocol network; a Transmission Control Protocol/Internet Protocol (TCP/IP) protocol network, a User Datagram Protocol (UDP) network, a Hypertext Transfer Protocol (HTTP) network, an RS485 network, or an Ethernet network.

3. The method of claim 1, wherein the network request is a Modbus protocol request.

4. The method of claim 1, wherein the slave computing device is a power monitoring device operable to sense a characteristic of electricity and to communicate data indicative of the sensed characteristic over the communication network, the characteristic including current, voltage, or power.

5. The method of claim 1, wherein the memory device is a cache memory.

6. The method of claim 1, wherein the first requesting network device receiving the supplied data packet is a first computing device and the second requesting network device making the additional network request for the data packet is a second computing device.

7. The method of claim 1, wherein the first requesting network device receiving the supplied data packet and the second requesting network device making the additional network request for the data packet are the same computing device.

8. The method of claim herein the network request is made by an Ethernet device.

9. The method of claim 1, wherein the examining the attributes of the supplied data packet includes statistically tracking which data packets are requested.

10. The method of claim 9, wherein the gateway copies the supplied data packets that are most requested based upon the tracked statistics.

11. The method of claim 9, wherein the gateway copies the supplied data packets that are most recently requested based upon the tracked statistics.

12. The method of claim 1 further comprising:
    adjusting a polling rate for the first requesting network device, the second requesting network device, or the slave computing device to reduce a frequency of polling requests to the slave computing device.

13. The method of claim 1 further comprising:
    benchmarking performance of the slave computing device in supplying the supplied data packet.

14. The method of claim 13 further comprising:
    the gateway determining optimal serial network settings based on the benchmarked performance; and
    providing the optimal serial network settings to a system administrator.

15. The method of claim 13 further comprising:
    the gateway analyzing throughput characteristics of the communication network based on the benchmarked performance; and
    expanding the communication network based upon the throughput analysis.

16. The method of claim 1 further comprising:
    the gateway determining a change in response time of the slave computing device in supplying the data packet.

17. The method of claim 16 further comprising at least one of:
    indicating, by the gateway, that network settings for the slave computing device are incorrect based upon the change in response time; and
    indicating a possible hardware failure of the slave computing device.

18. The method of claim 1, wherein the copying the supplied data packet to the memory device includes data caching for slave computing devices that have no logging memory.

19. A method for reducing polling requests communicated across a communication network in a power monitoring system to slave computing devices, comprising:
receiving, at a gateway, a network request for a data packet to be supplied by a slave computing device on the communication network, the data packet including electrical data indicative of a characteristic sensed by the slave computing device in the power monitoring system;
examining, at a gateway, attributes of the supplied data packet, wherein examining the attributes of the supplied data packet includes statistically tracking polling rates of network requests to a slave computing device, the data packet including electrical data indicative of a characteristic sensed by the slave computing device;
storing, under control of the gateway, a copy of the data packet in a memory;
determining, by the gateway, whether multiple network devices on the communication network are requesting the same electrical data from the slave computing device;
responsive to determining that multiple requesting network devices are requesting the same electrical data, the gateway communicating to at least one of the requesting network devices the copy of the data packet from the memory; and
responsive to communicating the copy of the data packet, the gateway adjusting a polling rate for the at least one requesting network device or the slave computing device to reduce a frequency of polling requests to the slave computing device.

20. A method for benchmarking and setting polling rates in a communication network comprising:
configuring each of a plurality of slave computing devices for data communication at a different baud rate;
sending to the plurality of slave computing devices network requests for a first set of data packets to be supplied by the plurality of slave computing devices;
receiving, at a gateway, from the plurality of slave computing devices the first set of data packets, the first set of data packets including electrical data indicative of a characteristic sensed by one of the plurality of slave computing devices in the power monitoring system;
examining, by the gateway, attributes of the supplied first set of data packets, the attributes including an idle time and a packet turnaround time;
adjusting a polling rate to adjust a frequency of polling requests to the plurality of slave computing devices;
receiving, at the gateway, from the plurality of slave computing devices a second set of data packets;
examining, by the gateway, the attributes of the second set of data packets;
logging benchmark results associated with the attributes of the second set of data packets; and
changing the baud rates and polling rates to obtain optimum baud rates and polling rates for at least one of the slave computing devices based on the benchmark results.

* * * * *